US008228953B2

(12) United States Patent
Elend

(10) Patent No.: US 8,228,953 B2
(45) Date of Patent: Jul. 24, 2012

(54) BUS GUARDIAN AS WELL AS METHOD FOR MONITORING COMMUNICATION BETWEEN AND AMONG A NUMBER OF NODES, NODE COMPRISING SUCH BUS GUARDIAN, AND DISTRIBUTED COMMUNICATION SYSTEM COMPRISING SUCH NODES

(75) Inventor: Bernd Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 877 days.

(21) Appl. No.: 11/722,350

(22) PCT Filed: Dec. 13, 2005

(86) PCT No.: PCT/IB2005/054208
§ 371 (c)(1),
(2), (4) Date: Jun. 20, 2007

(87) PCT Pub. No.: WO2006/067673
PCT Pub. Date: Jun. 29, 2006

(65) Prior Publication Data
US 2010/0002594 A1 Jan. 7, 2010

(30) Foreign Application Priority Data

Dec. 20, 2004 (EP) .................................... 04106746

(51) Int. Cl.
*H04J 3/06* (2006.01)
*H04L 12/28* (2006.01)
*G01R 31/08* (2006.01)
(52) U.S. Cl. .................... 370/503; 370/230; 370/258
(58) Field of Classification Search .................. 370/230, 370/258, 503
See application file for complete search history.

(56) References Cited

U.S. PATENT DOCUMENTS
2003/0067873 A1* 4/2003 Fuhrmann et al. ............ 370/230
(Continued)

FOREIGN PATENT DOCUMENTS
EP  1355460 A2  4/2003
(Continued)

OTHER PUBLICATIONS

Bogenberger et al, FlexRay International Workshop, Protocol Interview, pp. 1-71, Apr. 16 and 17, 2002.
(Continued)

*Primary Examiner* — Ricky Ngo
*Assistant Examiner* — Paul H Masur

(57) ABSTRACT

In order to provide a bus guardian (30) for monitoring communication between and among a number of nodes (100), in particular between and among a number of electronic control units, the bus guardian (30) being designed for monitoring at least one cyclic time-triggered communication media access schedule for transmitting messages between and among the nodes (100) across at least one communication media (10), in particular across at least one channel (12) and across at least one optional further channel (14), and being assigned to at least one communication controller (40), the communication controller (40) comprising the communication media access schedule, wherein the bus guardian (30) as well as a corresponding method require neither any a priori knowledge of the communication schedule nor any configuration parameter and monitor the communication media access schedule of the communication controller (40) even during start-up of the communication, it is proposed that that the bus guardian (30) is able to learn, in particular within the first cycle, about said communication media access schedule, and that the bus guardian (30) makes use of the learned knowledge with respect to at least one possible schedule violation (SV1, SV2, SV3), in particular with respect to at least one deviation from said communication media access schedule, for example during start-up of the communication.

22 Claims, 4 Drawing Sheets

U.S. PATENT DOCUMENTS

| | | | | |
|---|---|---|---|---|
| 2004/0081079 A1* | 4/2004 | Forest et al. | ............ | 370/216 |
| 2004/0081193 A1* | 4/2004 | Forest et al. | ............ | 370/458 |
| 2004/0090962 A1* | 5/2004 | Forest et al. | ............ | 370/392 |
| 2005/0141565 A1* | 6/2005 | Forest et al. | ............ | 370/503 |
| 2009/0125592 A1* | 5/2009 | Hartwich et al. | ............ | 709/206 |

FOREIGN PATENT DOCUMENTS

| | | |
|---|---|---|
| EP | 1355456 A1 * | 10/2003 |
| EP | 1355461 A2 | 10/2003 |
| GB | 2386804 A | 3/2002 |

OTHER PUBLICATIONS

H. Kopetz, et. al., "A Prototype Implementation of a TTP/C Controller", Proceedings SAE Congress 1997, Detroit, MI, USA, Feb. 1997. Society of Automotive Engineers, SAE Press. SAE Paper No. 970296.

Kopetz, Fault Containment and Error Detection TTP/C and FlexRay. Technical University of Vienna. Research Report 23/2002 Version 1.5. pp. 1-22.

Belschner et al., FlexRay Requirements Specification, BMW AG, DaimlerChrysler AG, Robert Bosch GmbH, General Motors/Opel AG, Version 2.0.2, Sep. 4, 2002, pp. 1-52.

* cited by examiner

BUS GUARDIAN AS WELL AS METHOD FOR MONITORING COMMUNICATION BETWEEN AND AMONG A NUMBER OF NODES, NODE COMPRISING SUCH BUS GUARDIAN, AND DISTRIBUTED COMMUNICATION SYSTEM COMPRISING SUCH NODES

SUMMARY

In accordance with some embodiments of the invention, a bus guardian monitors communication among a number of nodes and at least one cyclic time-triggered communication media access schedule for transmitting messages among the nodes. The bus guardian is able to learn about the schedule and can make use of learned knowledge with respect to at least one possible schedule violation during start-up of the communication.

BRIEF DESCRIPTION

Figure 1:
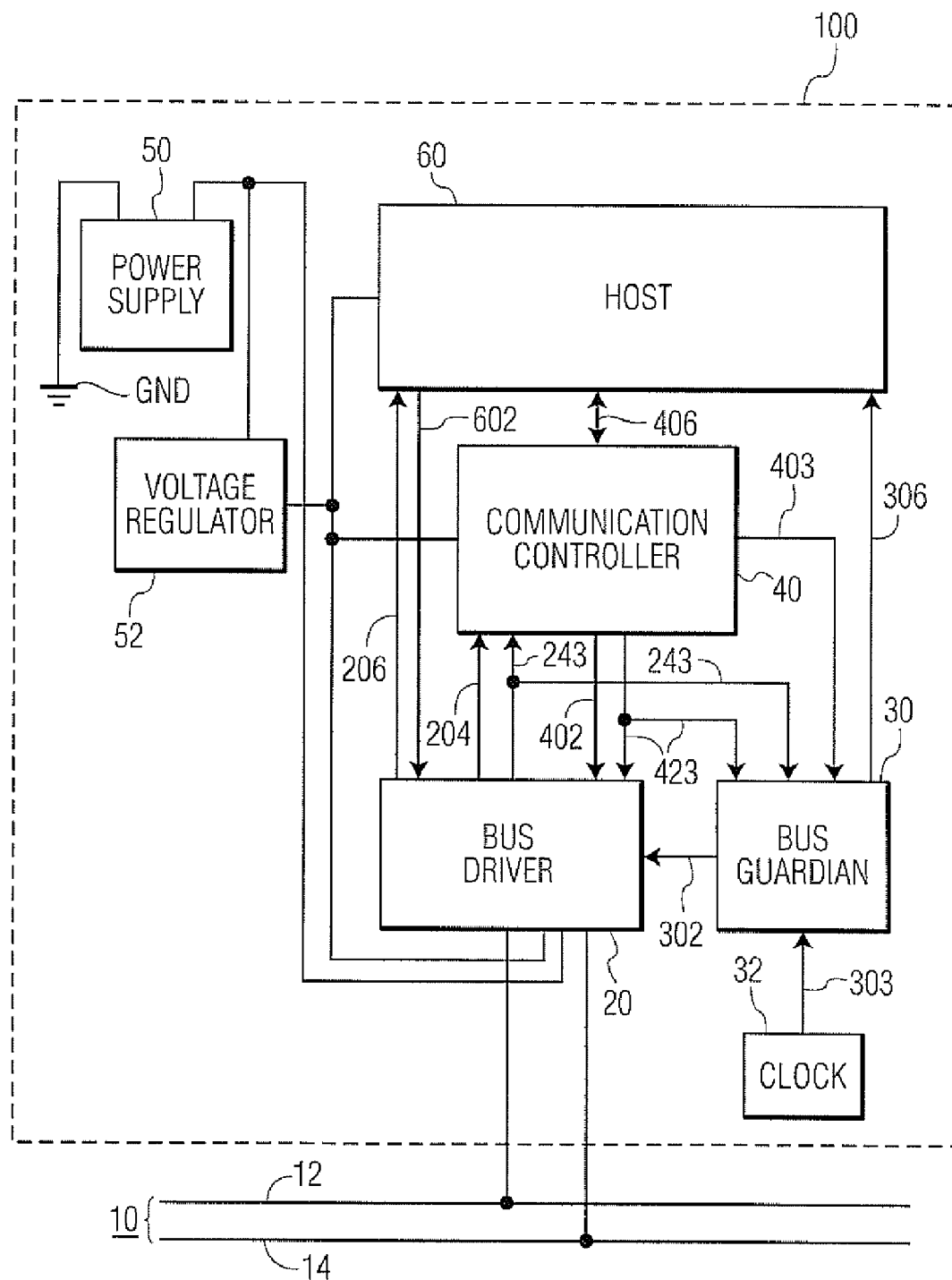
Figure 2:
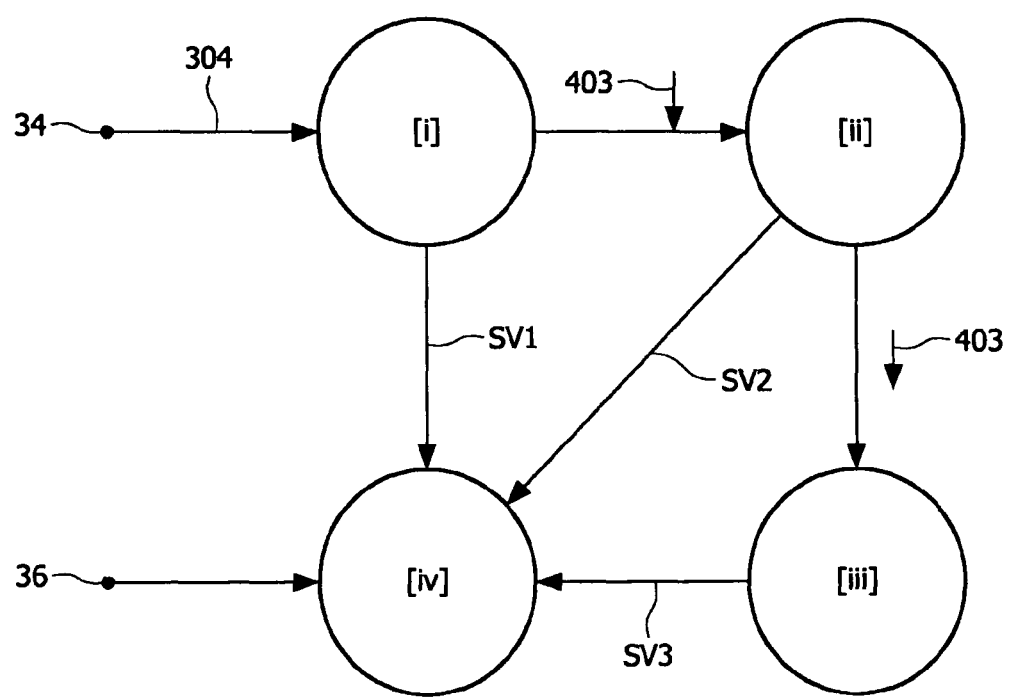
Figure 3A:
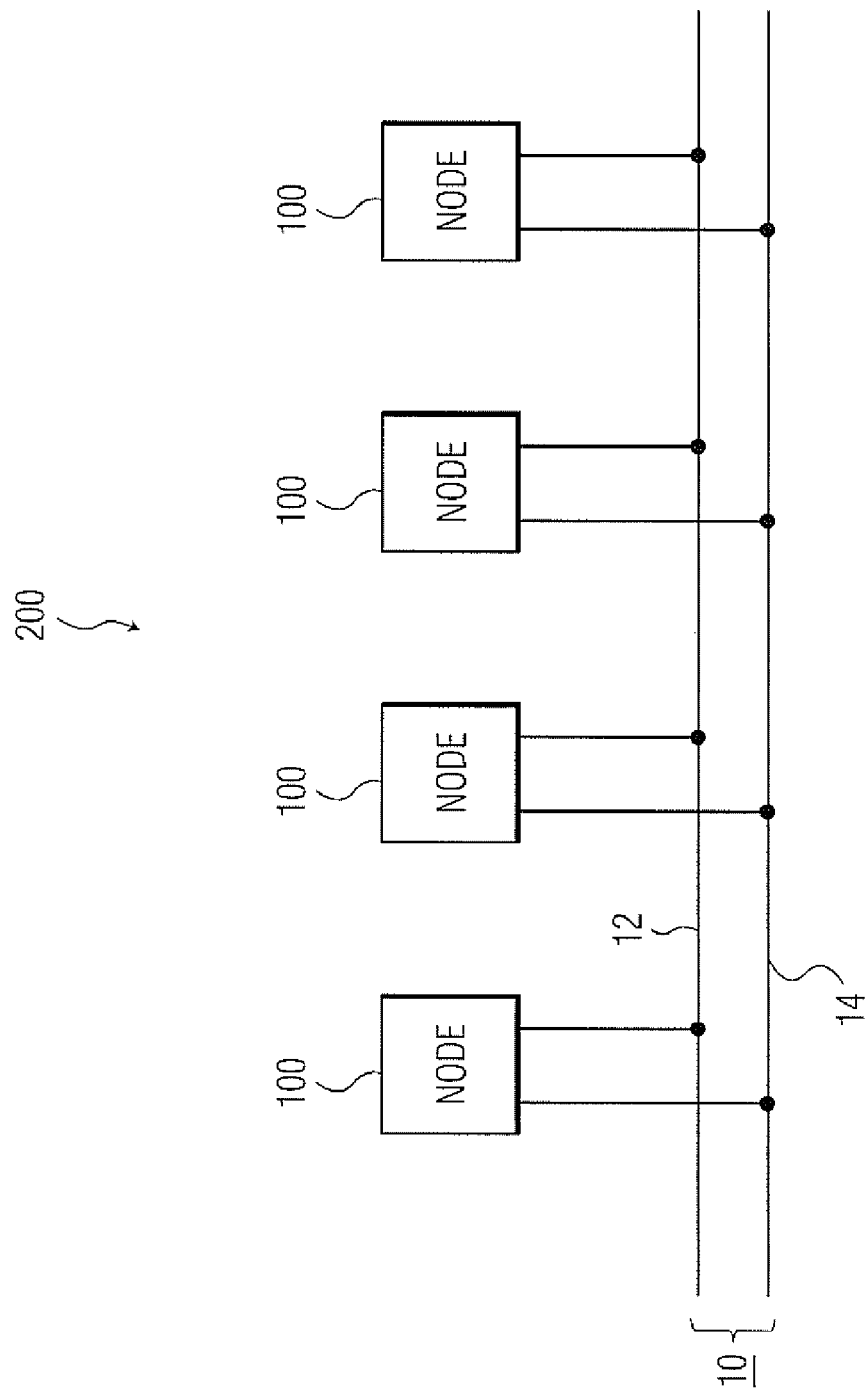
Figure 3B:
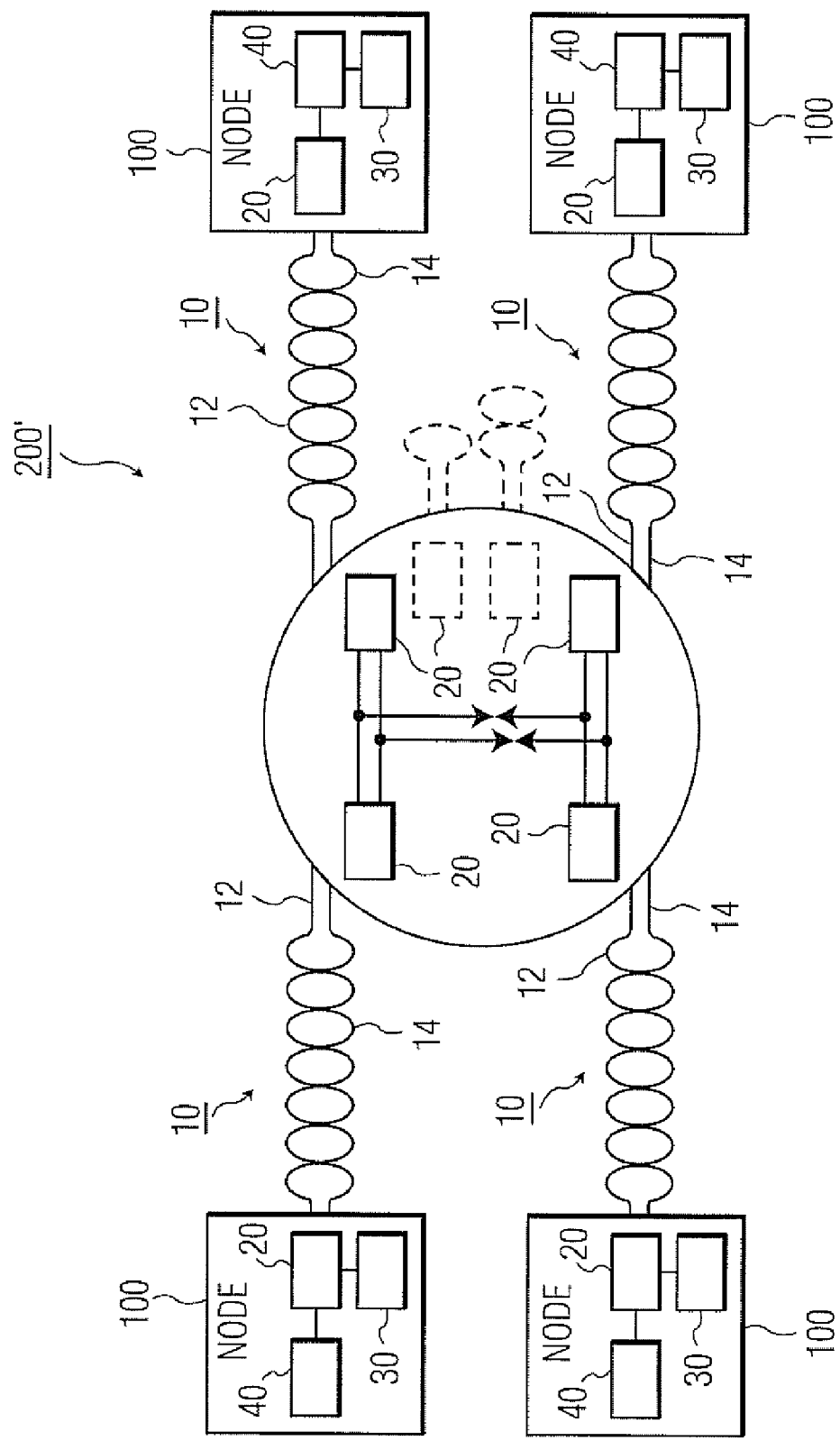

FIG. 1 schematically shows an embodiment of an electronic control unit or node according to the present invention, the electronic control unit or node working according to the method of the present invention;

FIG. 2 schematically shows the steps of the method of the present invention according to which the electronic control unit or node of FIG. 1 works;

FIG. 3A schematically shows a first embodiment of a fault-tolerant time-triggered network system according to the present invention, the network system comprising several electronic control units or nodes of FIG. 1;

FIG. 3B schematically shows a second embodiment of a fault-tolerant time-triggered network system according to the present invention, the network system comprising several electronic control units or nodes of FIG. 1.

FIG. 3B schematically shows a second embodiment of a fault-tolerant time-triggered network system according to the present invention, the network system comprising several electronic control units or nodes of FIG. 1.

The same reference numerals are used for corresponding parts in FIG. 1 to FIG. 3B.

DETAILED DESCRIPTION

In order to avoid unnecessary repetitions, the following description regarding the embodiments, characteristics and advantages of the present invention relates (unless stated otherwise) to the bus guardian 30 (cf. FIG. 1) according to the present invention, i.e. there is no need of configuring this bus guardian 30, to the electronic control unit or node 100 (cf. FIG. 1) according to the present invention, to the first embodiment of the distributed network system 200 (cf. FIG. 3A) according to the present invention as well as to the second embodiment of the distributed network system 200' (cf. FIG. 3B) according to the present invention, all embodiments being operated according to the method (cf. FIG. 2) of the present invention.

FIG. 1 depicts a communication node, namely an Electronic Control Unit (ECU) 100; two or more of such communication nodes 100 are connected in a communication system, namely in a FlexRay communication system 200, 200' as illustrated in FIGS. 3A, 3B.

The node 100 comprises basically five subsystems, namely a power supply unit or battery 50 with a voltage regulator 52 assigned to this power supply unit 50, a host unit 60, a communication controller 40, a bus driver 20 comprising a transceiver unit and being connected to a communication media 10, namely to a data bus comprising a first communication channel 12 and a redundant second communication channel 14 in order to transmit and/or to receive massages via the transceiver unit, and a bus guardian 30 on FlexRay protocol basis, in particular a so-called Bus Guardian without configuration parameter (BGwop); in this context, the BGwop 30 is embodied as a minimal bus guardian for time-triggered architecture (FlexRay communication systems or communication networks 200, 200'), wherein the bus guardian 30 does not require any configuration parameters or any further a priori knowledge.

The BGwop 30 is in general proposed to protect the communication media 10 from timing failures of the communication controller 40. To this aim, the BGwop 30 is connected to the communication controller 40 as well as to the bus driver 20. Beside this, the BGwop 30 is independent of the protocol communication controller.

In particular, the BGwop 30 monitors the communication media access schedule of the communication controller 40 in order to prevent the communication controller 40 from blocking the communication media 10 by temporarily or continuously sending messages (so-called "babbling idiot" failure); in order to maintain independence of the two redundant channels 12, 14, the node 100 may also comprise two bus drivers 20 and two BGwops 30.

If during start-up of the communication procedure the communication controller 40 succeeds to start up communication, i.e. is able to send appropriate communication elements, the communication controller 40 succeeds to integrate into a communication schedule, i.e. performs clock synchronization operation, or does not succeed to integrate into a communication schedule, for example due to wrong configuration.

In the latter case of not succeeding to integrate into a communication schedule, the communication controller 40 notices this failure by itself.

Consequently, the BGwop 30 can rely on that the first completely operated communication cycle either is correctly performed or is aborted by the communication controller 40. Thus, the BGwop 30 can learn about the communication schedule. After learning in the first complete communication cycle and with taking some FlexRay protocol configuration constraints for plausibility checks into account the BGwop 30 is able to perform its full operation and protect the communication media 10 from faulty access.

As can be taken from FIG. 1, the BGwop 30 is provided with the following input signals: an arming signal 403, namely a bus guardian arming (ARM) signal, from the communication controller 40, wherein a falling edge of said signal ARM indicates a start of the communication cycle; a transmit signal 423, namely a transmit data enable (TxEN) signal TxEN wherein the logical low state of said signal TxEN indicates a transmit access and said signal TxEN is transmitted from the communication controller 40 not only to the BGwop 30 but also to the bus driver 20; a receive signal 243, namely a receive data enable (RxEN) output signal RxEN, wherein the logical low state of said signal RxEN indicates activity on the communication media 10 and said signal RxEN is transmitted from the bus driver 20 not only to the BGwop 30 but also to the communication controller 40;

[0094] a reset signal 304 from any state 34 (cf. FIG. 2); and

[0095] a clock signal 303 from a clock unit 32 being assigned to the BGwop 30; the clock signal 303 can alternatively be generated internally in the BGwop 30.

The BGwop 30 puts out a control signal 302, namely a bus guardian enable (BGEN) input signal (HIGH active) to the transmitter unit of the bus driver 20 in order to enable and disable one or more output stages of the bus driver 20, in particular for disabling transmission in case of schedule violations SV1, SV2, SV3 (cf. FIG. 2) and a signal 306, namely an error flag indication signal, for example a single bit "error not" ERRN signal, to the host 60.

As can be further taken from FIG. 1, the bus driver 20 is provided with a signal 402, namely with a transmit data (TxD) input signal TxD, being transmitted from the communication controller 40, and designed for transmitting a signal 204, namely a receive data (RxD) output signal RxD, to the communication controller 40.

The host unit 60 is connected to the bus driver 20, to the BGwop 30 as well as to the communication controller 40. Beside this, the host unit 60 is designed for transmitting a control signal 602 to the bus driver 20 and receiving a status data signal 206 from the bus driver 20 (wherein neither said control signal 602 nor said status data signal 206 are related to the actual communication within the network 200); and transmitting a signal 406 to the communication controller 40 and receiving said signal 406 from the communication controller 40.

The power supply unit 50, namely the battery, is connected with ground GND and with the bus driver 20; the voltage regulator 52 is connected with the power supply unit 50, the host unit 60, the communication controller 40 and the bus driver 20.

The protocol of the FlexRay communication system 200 (cf. FIG. 3A), 200' (cf. FIG. 3B) can be divided into various layers of a layer architecture comprising a physical layer which defines how signals are actually transmitted; one task of the physical layer is to detect errors of the communication controller 40 in the time domain, which is done by the BGwop 30; a transfer layer which represents the kernel of the FlexRay protocol; a presentation layer which is concerned with frame filtering, frame masking, and frame status handling; and an application layer.

A state diagram of the BGwop 30 is depicted in FIG. 2. The BGwop 30 [i] enters BGwop-wake up mode after being provided with the reset signal 304 from any state 34; [ii] enters BGwop-start up mode after being provided with the first falling edge of the arming signal 403; [iii] enters BG-guarding mode after being provided with the second falling edge of the arming signal 403; and [iv] enters BG_fail silent mode upon detection of one or more of the possible schedule violations SV1, SV2, SV3.

In the following the states or modes [i], [ii], [iii], [iv] of the BGwop 30 are described in more detail:

Step [i] of waking up comprises enabling the bus driver 20, namely the transmitter unit of the bus driver 20. During said step [i] the first type SV1 of the possible schedule violations SV1, SV2, SV3 can be detected after a certain amount of negative edges of the transmit signal 423, for example after a maximum of 63 Wake-Up Symbols (WUS), and/or upon a negative edge of said transmit signal 423, while the receive signal 243 is on logical low state, and/or when said transmit signal 423 is on logical low state for longer than a certain timeout dWU.sub.0 of about or less than six microseconds, and/or when the clock unit 32 stops.

Step [ii] of starting up comprises the steps of enabling the transmitter unit of the bus driver 20, counting clock cycles in order to learn about the cycle time, and counting clock cycles until the first falling edge of said transmit signal 423, wherein in particular during the first cycle no dynamic frame is sent; in this context, a frame comprises all information transmitted in one slot with one identifier on one communication channel 12, 14 (in case of FlexRay protocol any further, in particular the second, communication channel 14 is redundant and thus optional).

During said step [ii] the second type SV2 of the possible schedule violations SV1, SV2, SV3 can be detected after a certain amount of negative edges of said transmit signal 423, for example after a maximum of sixteen static slots per Communication Controller (CC) 40, and/or upon a negative edge of said transmit signal 423, while said receive signal 243 is on logical low state, and/or when said transmit signal 423 is on logical low state for longer than a certain timeout of about 2.047 microseconds, and/or when the cycle time is longer than a certain timeout of about sixteen milliseconds, and/or when the clock unit 32 stops.

Step [iii] of guarding comprises the steps of enabling the transmitter unit of the bus driver 20, and counting clock cycles in order to supervise the cycle time.

During said step [iii] the third type SV3 of the possible schedule violations SV1, SV2, SV3 can be detected upon a certain, namely the $X_{cycleth}$, negative edge of the transmit signal 423, wherein $X_{cycle}$ sets a protocol configuration constraint, and/or upon a negative edge of said transmit signal 423, while said receive signal 243 is on logical low state, and/or when said transmit signal 423 is on logical low state for longer than a certain timeout of about 2.047 microseconds, and/or when the cycle time deviates more than a certain margin from at least one cycle time learned during step [ii], and/or when a time span between respective falling edges of the arming signal 403 and of the transmit signal 423 deviates more than a certain margin from the time span learned during step [ii], and/or when the clock unit 32 stops.

The step [iv] of behaving fail silent comprises the steps of disabling the transmitter unit of the bus driver 20, and not monitoring the input signals except the reset signal 304.

Two embodiments of an x-by wire FlexRay communication system 200, 200' are depicted in FIGS. 3A, 3B. The x-by wire FlexRay communication system 200, 200' can be arranged in linear bus topology (cf. FIG. 3A) or in star bus topology (cf. FIG. 3B).

A possible combination of linear bus topology according to FIG. 3A and of star bus topology according to FIG. 3B makes the x-by wire FlexRay-communication system 200, 200' very flexible.

LIST OF REFERENCE NUMERALS 100 node, in particular, an Electronic Control Unit (ECU)
10 communication media
12 communication channel, in particular, a first communication channel, of communication media 10
14 optional further, in particular, a redundant second, communication channel of communication media 10
20 bus driver, in particular, a transceiver, for example, a combination of a transmitter and a receiver, assigned to a communication media 10, in particular, assigned to a communication channel 12 and/or to an optional further communication channel 14
204 signal, in particular, a receive data (RxD) output signal RxD, from bus driver 20 to communication controller 40
206 signal, in particular, a status data signal, from bus driver 20 to host unit. 60
243 receive signal, in particular, a receive data enable (RxEN) output signal RxEN, from bus driver 20 to communication controller 40 as well as to bus guardian 30
30 bus guardian, in particular, without configuration parameter(s) and without any other a priori knowledge
32 clock unit, in particular, a clock 302 control signal, in particular, a bus guardian enable (BGEN) input signal BGEN: high active, from bus guardian 30 to bus driver 20
303 clock signal, in particular, from clock unit 32 to bus guardian 30
304 reset signal from any state 34
306 signal, in particular, an error flag indication signal ERRN, from bus guardian 30 to host unit 60
34 any state
36 power on
40 communication controller
402 signal, in particular, a transmit data (TxD) input signal TxD, from communication controller 40 to bus driver 20
403 arming signal, in particular, a bus guardian arming (ARM) signal ARM, from communication controller 40 to bus guardian 30
406 signal between communication controller 40 and host unit 60
423 transmit signal, in particular, a transmit data enable (TxEN) signal TxEN: low active, from communication controller 40 to bus driver 20 as well as to bus guardian 30
50 power supply unit, in particular, a battery
52 voltage regulator
60 host unit, in particular, an application host
602 signal, in particular, a control signal, from host unit 60 to bus driver 20
200 communication system, in particular, with linear topology (first embodiment; cf. FIG. 3A)
200' communication system, in particular, with star topology (second embodiment; cf. FIG. 3B)
a bus guardian arming (ARM) signal from communication controller 40 to bus guardian 30
a bus guardian enable (BGEN) input signal (HIGH active) from bus guardian 30 to bus driver 20
ERRN, an error flag indication signal between bus guardian 30 and host unit 60
GND ground
a receive data (RxD) output signal from bus driver 20 to communication controller 40
a receive data enable (RxEN) output signal from bus driver 20 to communication controller 40 as well as to bus guardian 30
SV1 schedule violation, in particular, a first type of deviation from said communication media access schedule
SV2 schedule violation, in particular, a second type of deviation from said communication media access schedule
SV3 schedule violation, in particular, a third type of deviation from said communication media access schedule
a transmit data (TxD) input signal from communication controller 40 to bus driver 20
a transmit data enable (TxEN) signal (LOW active) from communication controller 40 to bus driver 20 as well as to bus guardian 30

The invention claimed is:

1. A method for monitoring communication among a plurality of nodes, the method comprising:
assigning a communication media access schedule to a communication controller;
transmitting messages among the plurality of nodes based on the assigned communication media access schedule;
monitoring, with a bus guardian, the assigned communication media access schedule during start-up of a communication without using any configuration parameters;
learning, with the bus guardian, the assigned communication media access schedule; and
using the learned communication media access schedule to detect a schedule violation.

2. The method according to claim 1, further comprising:
waking up the bus guardian after providing the bus guardian with a reset signal from any state;
starting up the bus guardian after providing the bus guardian with a first falling edge of an arming signal from the communication controller;
having the bus guardian enter a guarding mode after providing the bus guardian with a second falling edge of the arming signal; and
having the bus guardian enter a fail silent mode upon detection of the schedule violation.

3. The method according to claim 2, wherein the waking up step further comprises:
enabling a bus driver;
detecting a first type of the schedule violation after a predetermined amount of negative edges of a transmit (TxEN) signal from the communication controller to the bus driver as well as to the bus guardian or upon a negative edge of said TxEN signal, while a receive (RxEN) signal, from the bus driver to and from the communication controller, is on a logical low state, or when said TxEN signal is on the logical low state for a predetermined time period, or when a clock unit being assigned to the bus guardian stops.

4. The method of claim 3, wherein the at least one predetermined time period is no more than six microseconds.

5. The method according to claim 3, wherein the starting up step further comprises:
enabling the bus driver to count clock cycles in order to learn about a cycle time;
counting the clock cycles until a first falling edge of said TxEN signal, wherein a frame comprises all information transmitted in a slot with an identifier on a channel; and
detecting a second type of the schedule violation after a predetermined amount of negative edges of said TxEN signal, or upon a negative edge of said TxEN signal, while said RxEN signal is on the logical low state, or when said TxEN signal is on the logical low state for the predetermined time period or when the clock cycle is longer than a certain timeout, or when the clock unit stops.

6. The method according to claim 5, wherein the entering the guarding mode step further comprises:
enabling the bus driver to count clock cycles in order to supervise the cycle time; and
detecting a third type of the schedule violation upon a certain negative edge of the TxEN signal, or upon a negative edge of said TxEN signal, while said RxEN signal is on the logical low state, or when said TxEN signal is on the logical low state for at least one predetermined time period or when the cycle time deviates more than a predetermined margin from at least one learned cycle time, or when a time span between respective falling edges of the arming signal and of the TxEN signal deviates more than a predetermined margin from a time span learned during said starting step, or when the clock unit stops.

7. The method of claim 5, wherein the at least one predetermined time period is greater than 2.047 microseconds.

8. The method of claim 5, wherein the certain timeout is about sixteen milliseconds.

9. The method according to claim 2, wherein the entering the fail silent mode step further comprises:
disabling the bus driver; and
only monitoring the reset input signal.

10. The method of claim 1, further comprising:
ensuring error containment in a time domain of a node.

11. The method of claim 10, further comprising:
correcting differences in clock offsets.

12. The method of claim 10, further comprising:
correcting differences in clock rates.

13. The method of claim 1, wherein a linear bus topology is used.

14. The method of claim 1, wherein a star bus topology is used.

15. A communication apparatus, the apparatus comprising:
a power supply unit;
a host unit;
a communication controller;
a bus driver; and
a bus guardian, wherein the bus guardian learns a communication media access schedule, uses the learned communication media access schedule to detect a schedule deviation, and monitors the communication media access schedule during start-up of a communication without using any configuration parameters.

16. The apparatus of claim 15, further comprising:
a voltage regulator connected to the power supply unit.

17. The apparatus of claim 15, further comprising:
a voltage regulator connected to the host unit.

18. The apparatus of claim 15, further comprising:
a voltage regulator connected to the communication controller.

19. The apparatus of claim 15, further comprising:
a voltage regulator connected to the bus driver.

20. The apparatus of claim 15, wherein a linear bus topology is used.

21. The apparatus of claim 15, wherein a star bus topology is used.

22. A method for monitoring communication among a plurality of nodes, the method comprising:
assigning a communication media access schedule to a communication controller;
transmitting messages among the plurality of nodes based on the assigned communication media access schedule;
monitoring the assigned communication media access schedule by means of a bus guardian, wherein the bus guardian monitors the communication media access schedule during start-up of a communication without use of any configuration parameters;
using the monitored communication media access schedule to distinguish between allowed and forbidden deviations.

* * * * *